Patented Mar. 12, 1935

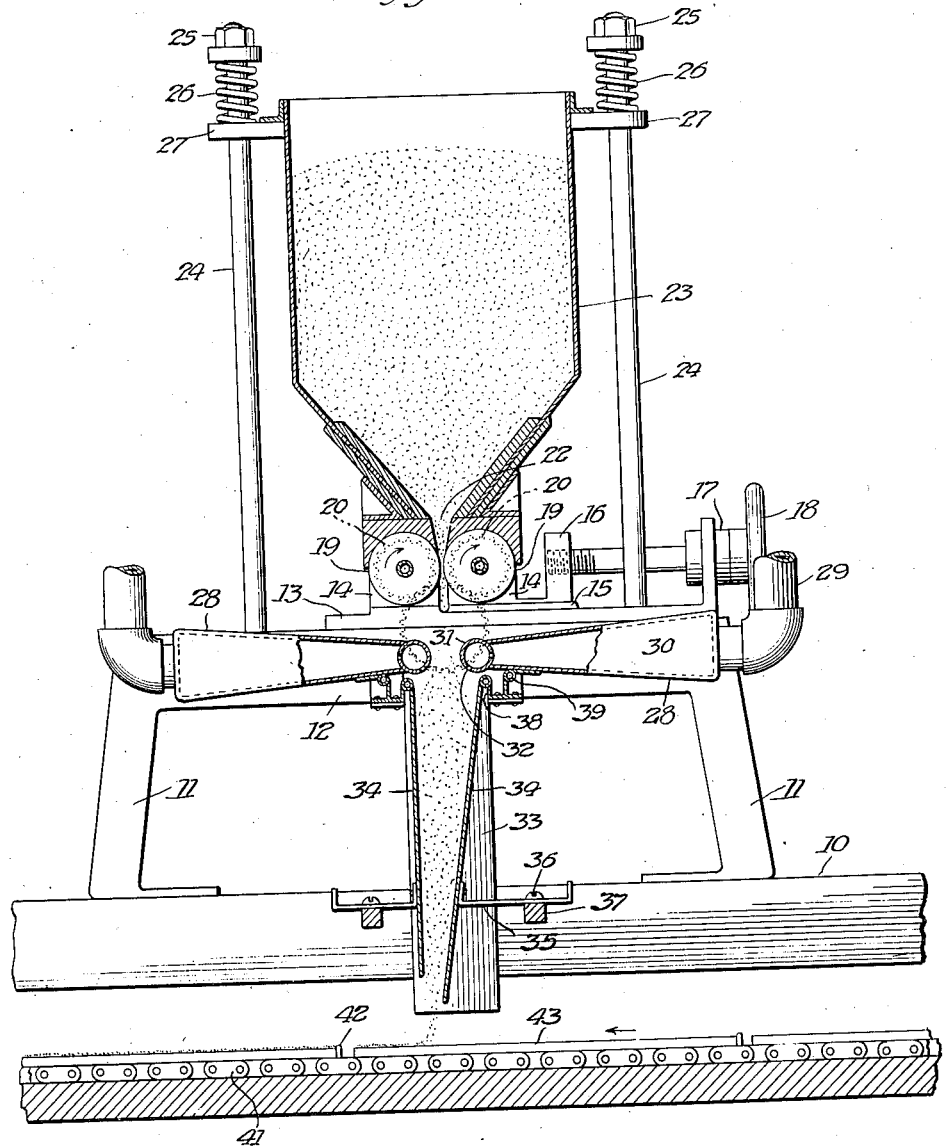

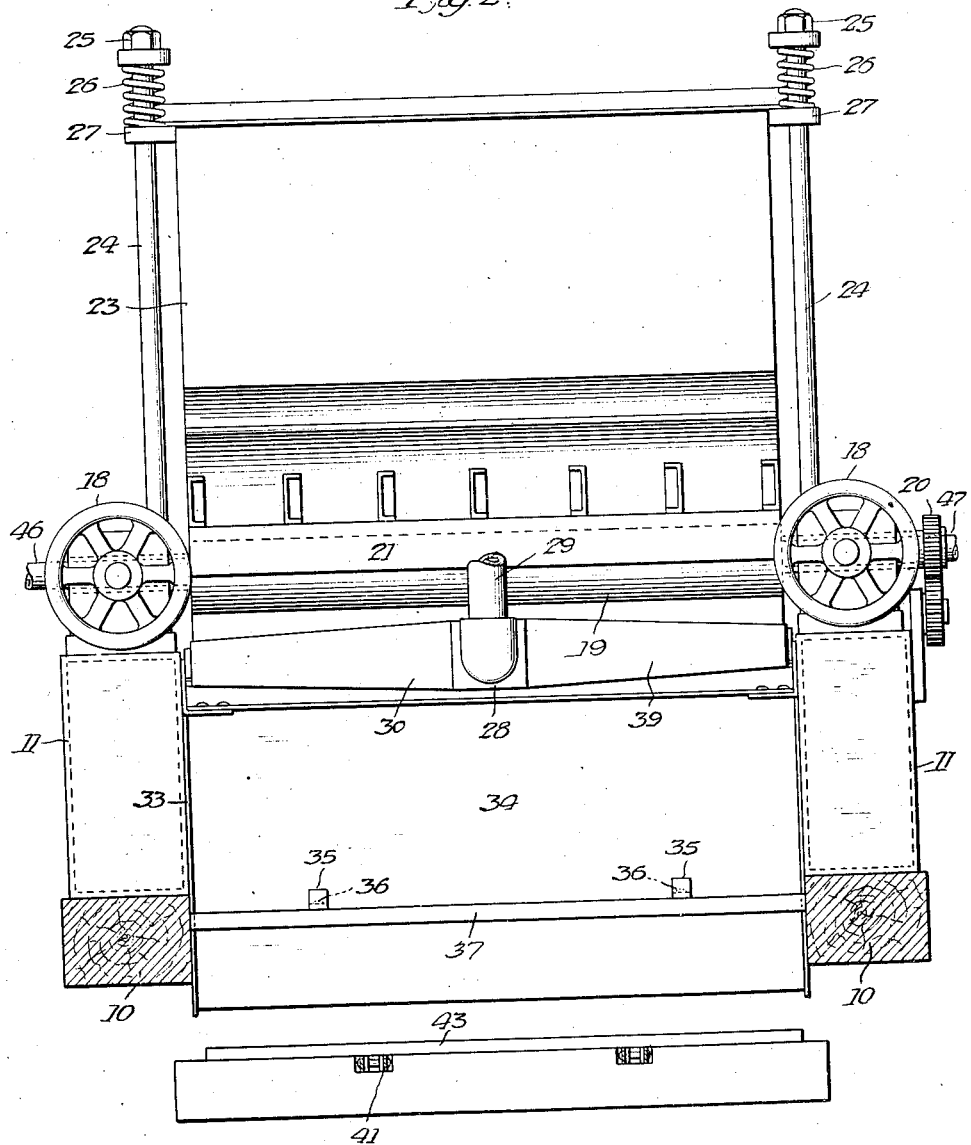

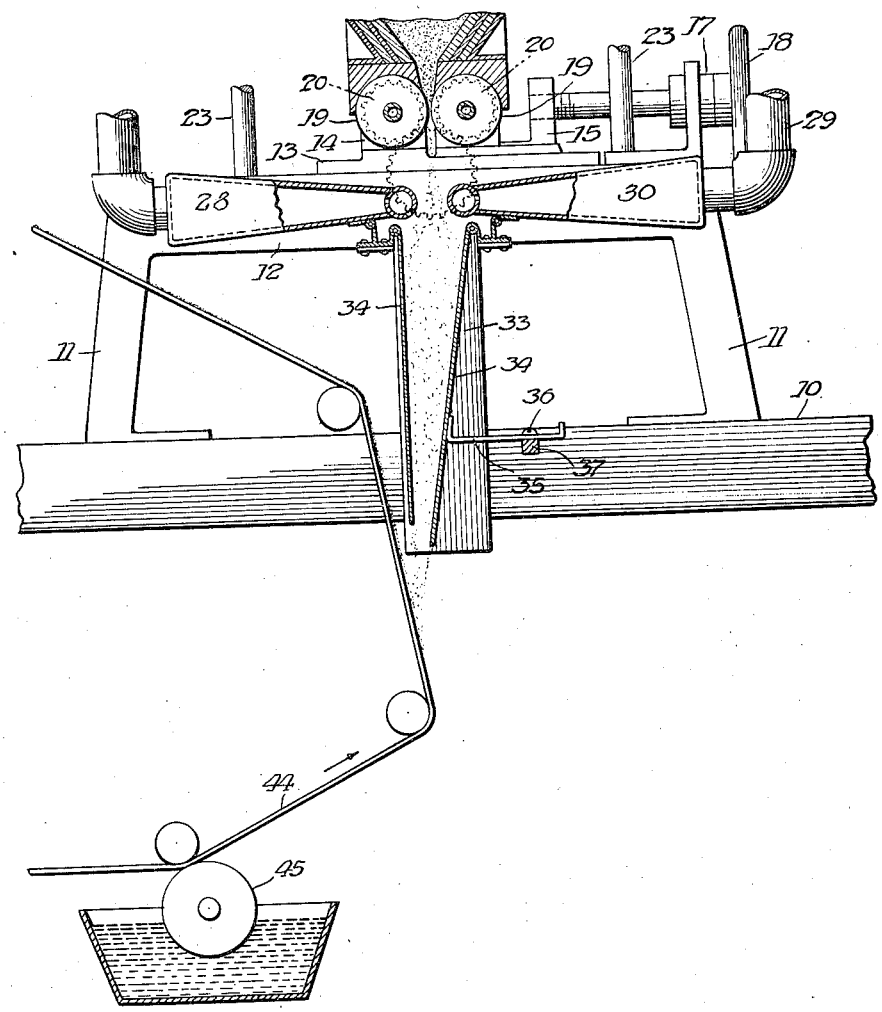

1,994,263

UNITED STATES PATENT OFFICE 1,994,263

APPARATUS FOR DISTRIBUTING SOLIDS

Cornelius B. Woodward and Robert B. Keefe, Chicago, and Edwin W. Colt, Glen Ellyn, Ill., assignors to Armour and Company, Chicago, Ill., a corporation of Illinois Original application September 17, 1931, Serial No. 563,350. Divided and this application October 7, 1932, Serial No. 636,678

15 Claims. (Cl. 91—18)

The present invention relates to the distribution of materials, and has particular reference to an apparatus for distributing finely divided solid particles of adhesive materials upon an appropriate carrier such as ply-wood or sandpaper sheets; this application being a division of our co-pending application Serial No. 563,350 filed September 17, 1931.

Heretofore considerable difficulty has been encountered in producing a satisfactory distribution of finely divided adhesive materials upon carriers. That is, it has been difficult to evenly distribute powdered or granular materials upon a surface to which such materials will uniformly adhere as a coating. This is particularly true in the case of the application of powdered adhesive materials, such as blood albumen to wet veneer sheets; and abrasives to a sheet of paper or fabric previously rendered adhesive.

In accordance with our invention, the finely divided material is passed from an appropriate hopper through spaced rollers, whereby an accurately determined amount of material is obtained. The powdered or granular material is allowed to fall into a stream of air. As a result an even distribution of the individual particles in the air is obtained. The air stream is then directed against the appropriate carrier upon which it is desired to effect a distribution of the solid particles.

In the drawings:

Fig. 1 is an end elevation, partly in section of apparatus suitable for coating ply-board sheets with powdered albumen;

Fig. 2 is a side elevation of the device shown in Fig. 1; and

Fig. 3 is an end view, partly in section, of apparatus modified for the production of sandpaper.

In the embodiment of the invention shown in the drawings, the frame structure of the apparatus is composed of timbers 10 having upwardly extending supporting members 11 which are connected by the horizontal bars 12.

Oppositely disposed on the bars 12 are adjustable bearing supporting members 13 having mounted thereon bearings 14. On each of the bearing supporting members 13 is provided a slidable bearing support 15 having an upwardly extending projection 16. This projection is provided with an opening into which is threaded the shaft of a micrometer adjusting device 17 having a hand-operated wheel 18. It is evident that by turning the wheel in one direction the slidable bearing support is caused to move forward while rotation of the wheel in the opposite direction effects a retraction of said slidable bearing support.

Mounted in the corresponding bearings 14 of the oppositely disposed bearing supporting members 13 are rollers 19. These rollers are driven by driven gears 20 meshing with a suitable driving gear, and their direction of rotation is clockwise, as shown by the arrows in Fig. 1. The direction of rotation may, however, be regulated in accordance with operating factors such as the size or nature of the material being distributed and speed of operation of the apparatus.

It is evident that by regulating the micrometer adjusting mechanism, the distance between the rolls may be varied, thereby accurately controlling the amount of materials which will pass therebetween. To produce an even distribution it is desirable to synchronize the two micrometer adjusting devices in order to insure a uniform space between the rollers.

In the distribution of finely divided materials, particularly those tending to become adhesive in the presence of moisture, it is desirable to provide the rollers 19 with heating means. As shown in Fig. 2, the hollow rollers may be provided in such instances with an inlet steam pipe 46 and an outlet or condensate pipe 47. The rollers are thus maintained at a sufficiently elevated temperature to preclude collection of moisture thereon, or to impart the desired elevation of temperature to the material being distributed.

Mounted upon rolls 19 are semi-circular bearing sleeves 20 which form a rigid support for the feed hopper 23. The feed hopper is provided with a sloping bottom terminating in an opening 22 which is located directly above the opening between rolls 19.

Extending vertically from bars 12 of the frame are rods 24 having nuts 25 and springs 26 positioned about the upper portions thereof. The bottom of springs 26 rest against the top of ears 27 through which rods 24 extend. Ears 27 are rigidly secured to the top of the feed hopper to form a support for the latter.

It is desirable that the hopper rest firmly against the feed rollers. The weight of the hopper and its contents assist in this respect, but it is preferred to regul te nuts 25 so that springs 26 exert pressure to the ears 27, thereby pressing the feed hopper downwardly against the rolls.

Directly beneath the opening between the feed rollers are positioned air lines 28. These lines consist of supply pipes 29, extended manifold chambers 30, and nozzle portions 31, the latter being provided with outlet openings 32.

The air lines 28 direct streams of air downwardly through an adjustable discharge hopper or chute which is made up of downwardly extending end plates 33, and adjustable side plates 34. Adjustment of the side plates is effected by regulating the position of bars 35 with respect to clamping screws 36, the latter being rigidly supported by bars 37 which are mounted on timbers 10 of the frame.

Where operation of the apparatus is constant it may be desirable to omit adjustment of the discharge chute, but it is preferred to adjust at least one of the sides 34 in accordance with any particular operating conditions.

The side plates 34 are pivoted at their upper portion by means of hinges 38, the stationary portions of which are secured to the frame structure.

Hinges 39 are secured to the frame structure and to the expansion or manifold chambers 28, whereby said chambers may be pivoted to change or adjust the direction of the air streams through the discharge chute.

In addition, hinges 38 and 39 cooperate, as shown in Figs. 1 and 2, to form a substantially dust tight connection between the air lines and the discharge chute. These hinges and end plates 33 reduce loss of air and material being distributed to a minimum.

A traveling mechanism is mounted in the path of travel of air issuing from the discharge chute, and serves to convey past the discharge chute a carrier upon which it is desired to distribute the finely divided materials. The embodiment shown in Figs. 1 and 2 of the drawings is particularly adapted for the coating of ply-board sheets with powdered albumen, and consists of a stationary frame 40 having traveling chains 41 mounted thereon. Stops 42 may be provided to insure traction between the chains and the ply-board, the latter being illustrated at 43.

For producing open coat sandpaper, for example, a modified form of carrier-conveying mechanism is desirable. In Fig. 3 a continuous sheet of paper illustrated at 44 is caused to contact a glue coating roller 45 and then to pass upwardly through the particle-containing stream of air issuing from the discharge chute. It is preferred that the angle of the paper with respect to the air stream be such that a pronounced glancing effect is produced. The exact angle of contact will in any case be adjusted in accordance with particular operating conditions and with the grade of paper desired.

As the angle of contact between the sheet and the stream of air from the discharge chute approaches 90° a larger and more closely packed amount of particles will be deposited upon the carrier.

In operation, the feed hopper is filled with finely divided or powdered, abrasive or adhesive materials, such as powdered glue or blood albumen. The feed rollers are then rotated to supply a curtain-like stream of solid particles to the discharge chute. As these particles enter the discharge chute they come in contact with streams of air from air nozzles 32. Consequently the particles are caught by the somewhat turbulent air streams and incorporated therein. By the time the air stream has reached the outlet end of the discharge chute, the solid particles are evenly distributed therein, and when the air stream strikes the wet ply-board or other carrier having an affinity for the solid particles, an evenly distributed coating results.

It is important for obtaining the best results that the operation of the apparatus be maintained as constant as possible.

It is also desirable that the apparatus be sufficiently rigid to prevent an inconstant flow of materials. The firm seating of the feed hopper upon the feed rolls materially assists in this respect.

The micrometer adjustment of the feed rolls allows an accurate control of the distance therebetween. As the distance between the rolls may be only a few thousandths of an inch, a small variation will be reflected by a change in the character of the finished product.

In a compressed air mechanism the pressure and consequently the supply of air is apt to fluctuate with fluctuations in the compression apparatus. It will be seen that such fluctuations in the air stream results in a finished product which is not of constant character. It is our discovery that such fluctuations in the air supply may be offset by employing two air streams such as the converging streams shown in the drawings.

In a desirable mode of operation, one of the air nozzles is provided with openings sufficiently large to supply the requisite amount of air for properly distributing the materials while the other air nozzle is merely "cracked", that is, it is provided with small openings whereby a limited quantity of air is blended with the major air stream. This small air stream has a steadying influence upon the major air stream and permits an even distribution of the finely divided materials.

In normal operation, the air pressure employed may be between one and ten pounds, depending upon the result desired.

The air issuing from the nozzles is deflected from the sides of the discharge chute to create sufficient turbulence to insure even distribution of the solid particles. Thus the sides of the discharge chute, act to a certain extent as baffles. Other baffle arrangements may be used if desired.

By pivoting the sides of the discharge chute at their upper portion, the cross sectional area of the chute may be reduced toward the outlet end, to increase the speed of the particle-containing air stream. Once the desired position is determined the same may be maintained constant by tightening the clamping screw 36.

From the foregoing illustrative description it will be seen that the apparatus is susceptible of various changes, and such modifications as come within the spirit of our invention are intended to be included in the appended claims.

We claim:

1. Apparatus of the type described, comprising a hopper having a feed opening therein, spaced rollers mounted beneath the feed opening in said hopper, means for varying the distance between said rollers, compressed air supply lines below said rollers and on each side of the opening between said rollers, said air lines having openings producing converging air streams, a discharge chute enclosing said air streams, an adjustable baffle plate in said discharge hopper, and a carrier-supporting mechanism in the path of travel of air from said discharge chute.

2. Apparatus for distributing finely divided solids, comprising a feed hopper having a feed opening in the lower portion thereof, spaced rollers positioned beneath said opening, a discharge chute beneath said spaced rollers and having a side parallel to said rollers pivotally mounted at the upper portion of said hopper, and means for directing an air stream through said discharge chute.

3. Apparatus of the type described, comprising a hopper for finely divided solids having a feed opening therein, spaced adjustable smooth face rollers mounted beneath said feed opening, a relatively large discharge chute beneath said rollers, and means for directing a stream of air downwardly through said discharge chute transversely of the falling solids.

4. Apparatus for distributing powdered albumen, comprising a hopper having a feed opening therein, heated rollers mounted beneath said feed opening, said rollers being spaced to regulate the outflow of material from said hopper, a discharge chute beneath said spaced rollers, means for passing a turbulent stream of air downwardly through said discharge chute in a direction transversely of the falling albumen, and a traveling carrier support adjacent said discharge hopper and in the path of travel of the albumen issuing therefrom.

5. Apparatus for producing open-coat sandpaper, comprising a hopper for abrasive having a feed opening therein, spaced hollow rollers mounted beneath said opening, a discharge chute communicating with the opening between said rollers, means for interiorly heating the rollers, means for directing a turbulent stream of air through said chute transversely of the falling abrasive, glue coating means, and means for passing a sheet of paper through said glue coating means and then past said discharge hopper at an angle thereto.

6. An apparatus for distributing finely divided solids, comprising a hopper having a longitudinal feed opening therein, spaced rollers beneath and coextensive with said feed opening, a compressed air line on each side of the opening between said rollers and producing a turbulent stream of air in a direction across the falling solids, a discharge chute loosely enclosing the falling solids and air, and a conveyor operable to present a carrier for said finely divided solids in the path of travel of the falling solids from said hopper.

7. An apparatus for distributing finely divided solids, comprising a hopper having a longitudinal feed opening therein, spaced hollow rollers beneath and coextensive with said feed opening, means for regulating the space between said rollers, means for introducing heating steam to the interior of the rollers, a discharge chute communicating with the space between said rollers and horizontally coextensive therein, two air lines having outlets horizontally coextensive with said rollers and supplying streams of air to said chute in opposite directions transverse to the path of the falling solids, and conveyor means for continuously passing a carrier for said solids through the path of travel of the same issuing from said chute.

8. Apparatus for distributing finely divided solids, comprising a feed hopper having a horizontally elongated feed opening therein, spaced heated rollers beneath said opening and coextensive therewith, a discharge chute communicating at its upper end with said spaced rollers, means for directing an air stream laterally through said discharge chute, and means for commingling another air stream with said first air stream in the discharge hopper in the path of the falling solids.

9. Apparatus for distributing finely divided solids, comprising a hopper having a feed opening, adjustably mounted peripherally spaced feed rollers for controlling the discharge from the hopper, a generally vertical discharge chute beneath the feed rollers with a side pivoted for adjustment relative to the vertical, means for introducing a turbulent stream of air in the path of the falling solids, and conveyor means for moving a carrier beneath the lower end of the chute.

10. Apparatus for distributing finely divided solids, comprising a hopper having a feed opening, adjustably mounted peripherally spaced smooth face feed rollers for controlling the discharge from the hopper, a generally vertical discharge chute beneath the feed rollers with opposite sides pivoted for adjustment at inclinations to the vertical, means for directing air streams from opposite directions transversely of the chute intersecting the path of the falling solids, and means for moving a carrier beneath the lower end of the chute.

11. Apparatus for distributing finely divided solids, comprising a hopper having a feed opening, adjustably mounted peripherally spaced hollow steam heated feed rollers for controlling the discharge from the hopper, a generally vertical discharge chute beneath the feed rollers for receiving the solids with opposite sides in planes parallel to the roller axes and one at least pivoted for adjustment at different inclinations to the vertical, air pipes located beneath the hopper feed opening on opposite sides of the chute axis and discharging flattened air streams from opposite sides into the flattened curtain of solids within and adjacent the entrance to the chute.

12. A device for uniformly distributing particles of finely divided solids on a carrier, comprising means for producing a controlled curtain of particles of a falling solid including spaced rollers, means for directing an air blast downwardly and across said curtain of freely falling solids, and a distribution chamber for said solids and said air blast, said chamber having a wall in the path of said stream of air beyond the point at which said stream of air crosses said curtain of solids and a discharge opening in its lower portion for withdrawing particle-laden air therefrom.

13. A device for uniformly distributing particles of a finely divided solid upon a carrier, comprising means for producing a controlled and relatively wide curtain of particles of a falling solid, a distribution chamber in the path of said falling solids, a compressed air vent operable to direct a current of air downwardly through said chamber and transversely of said curtain of solids, said chamber having a discharge opening in its lower portion sufficiently large to reduce the velocity of said compressed air when issuing therefrom, and means for presenting a carrier of substantially the same width as said discharge opening below said discharge opening.

14. A device for uniformly distributing particles of finely divided solids on a carrier, comprising means for producing a controlled curtain of particles of a falling solid, means for directing an air blast downwardly and across said curtain of freely falling solids, and a distribution chamber for said solids and said air blast, said chamber having a wall in the path of said stream of air beyond the point at which said stream of air crosses said curtain of solids and a discharge opening in its lower portion for withdrawing particle-laden air therefrom.

15. A device for uniformly distributing particles of a finely divided solid on a carrier, comprising means for producing a controlled curtain of particles of a falling solid, a distribution chamber in the path of said falling solids, said distribution chamber having an outlet opening in its lower portion, and means for uniformly distributing the particles of said solid in air within said chamber and for directing a stream of the particle-laden air from said chamber downwardly through said outlet opening.

CORNELIUS B. WOODWARD.
ROBERT B. KEEFE.
EDWIN W. COLT.